United States Patent
Lin et al.

(10) Patent No.: US 12,417,579 B2
(45) Date of Patent: Sep. 16, 2025

(54) SYSTEMS AND METHODS FOR RECURSIVE DIMENSIONAL DECOMPOSITION CONVOLUTION

(71) Applicant: QUALCOMM Incorporated, San Diego, CA (US)

(72) Inventors: Jamie Menjay Lin, San Diego, CA (US); Kai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 18/467,451

(22) Filed: Sep. 14, 2023

(65) Prior Publication Data

US 2025/0095281 A1  Mar. 20, 2025

(51) Int. Cl.
*G06T 15/20* (2011.01)

(52) U.S. Cl.
CPC .... *G06T 15/20* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2023/0123811 A1* 4/2023 Collins .................. G06F 8/443
                                                    706/17

OTHER PUBLICATIONS

International Search Report and Written Opinion—PCT/US2024/039203—ISA/EPO—Nov. 5, 2024.
Kaiser L., et al., "Depthwise Separable Convolutions for Neural Machine Translation", arXiv: 1706.03059v2 [cs.CL], Jun. 16, 2017, XP093217635, pp. 1-10, section 2.
Liu T., et al., "Hyperspectral Image Super-Resolution via Dual-Domain Network Based on Hybrid Convolution", arxiv.org, Cornell University Library, 201 Olin Library Cornell University Ithaca, NY 14853, [Online], 20 Pages, Apr. 10, 2023, XP091480442, section III, figure 1.
Mehta S., et al., "DiCENet: Dimension-Wise Convolutions for Efficient Networks", IEEE Transactions on Pattern Analysis and Machine Intelligence, vol. 44, No. 5, [Online], May 5, 2022, pp. 1-1, pp. 2416-2425, XP093217651, USA, abstract, figure 1.
Xie X., et al., "HGC: Hierarchical Group Convolution for Highly Efficient Neural Network", arXiv: 1906.03657v1 [cs.CV], Jun. 9, 2019, XP093217652, pp. 1-10, Section 3, figure 2.

\* cited by examiner

*Primary Examiner* — Frank S Chen
(74) *Attorney, Agent, or Firm* — Polsinelli LLP

(57) ABSTRACT

Dimensional decomposition convolution systems and techniques are described. A system receives a tensor including a first number of dimensions. The system processes a variant of the tensor using a convolution function including a second number of dimensions to generate a processed tensor. The first number of dimensions is greater than the second number of dimensions. A plurality of dimensions from the first number of dimensions of the tensor are grouped into a dimension of the variant of the tensor to reduce dimensionality of the variant of the tensor to the second number of dimensions.

30 Claims, 8 Drawing Sheets

FIG. 2

Input Tensor $X$ 405
of shape $[s_i]$, $i=0, 1, ..., D-1$, [kernel, stride, pad], and target execution dim $D_{target} < D$

Algorithm 410:

Stage 420: Function instantiation:

| | |
|---|---|
| $f(d) = \phi$ | # Function is initialized as NOP |
| $b = s_0$ | # "b" is for the tensor size in the batch dimension |
| for d=D to $D_{target}$ do | |
|     Assign argument tuple $\alpha_{d-1} = (k_i, s_i, p_i)$ for dim $d-1$ | # Initiate convolution config arguments as needed |
|     $f(d) = Conv(d-1,[0:d-1]) \circ Conv(1, \alpha_{d-1}) \circ f(d)$ | # Recursive update for $f(d)$ for Equation 320 |
|     $f(d) = f(d) \circ Conv(d-1,[0:d-1]) \circ Conv(1, \alpha_{d-1})$ | # Recursive update for $f(d)$ for Equation 325 |
|     Transpose on dimension $(d-1)$ to next to batch dimension 0 | # Move dimension of unit kernel to next to 0 |
|     $b = b*(d-1)$ | # Calc aggregated size of "peeled" & batch dims |
|     Reshape($b$, shape[1:d-1]) | # Aggregate "peeled" unit-kernel and batch dims |
| end for | |
| $f(d) = Conv(D_{target}) \circ f(d)$ | # Update $f(d)$ on dim $D_{target}$ for Equation 320 |
| $f(d) = f(d) \circ Conv(D_{target})$ | # Update $f(d)$ on dim $D_{target}$ for Equation 325 |
| return $f(d)$ | |

Stage 425: Function execution (training or inference):

| | |
|---|---|
| $x = X$ | |
| $y = f_d(x)$ | # $f_d = f(d)$ is the function instantiated in Stage 1 |
| return $y$ | |

Output Tensor $Y$ 415:
of shape $[s_o]$, $o=0, 1, ..., D-1$

FIG. 4

SYSTEMS AND METHODS FOR RECURSIVE DIMENSIONAL DECOMPOSITION CONVOLUTION

FIELD

The present disclosure generally relates to optimizing processing of data using machine learning model(s). For example, aspects of the present disclosure relate to systems and techniques for processing data that has a first number of dimensions using a convolution function associated with a second number of dimensions that is lower than the first number of dimensions, for instance by iteratively "peeling off" one dimension at a time while grouping remaining dimensions and aggregating peeled dimensions into a batch dimension.

BACKGROUND

Machine learning models are useful for a variety of tasks, including image processing, computer vision, natural language processing, and generating content. Machine learning models can be used to process tensors. Some machine learning models, such as convolutional neural networks, use convolutional layers that process data (e.g., convolve the data). Convolutional layers are generally configured to accept data having a specific and limited number of dimensions. In some cases, a dataset may have more dimensions than a convolutional layer of a machine learning model is configured to handle, which may prevent the machine learning model from being able to process the dataset.

BRIEF SUMMARY

Systems and techniques for dimensional decomposition convolution are described, for allowing a dataset with a first number of dimensions to be processed using a convolution function with a second number of dimensions that is lower than the first number of dimensions. In some examples, a system for dimensional decomposition convolution receives a tensor including a first number of dimensions. The system processes a variant of the tensor using a convolution function including a second number of dimensions to generate a processed tensor. The first number of dimensions is greater than the second number of dimensions. A plurality of dimensions from the first number of dimensions of the tensor are grouped into a dimension of the variant of the tensor to reduce dimensionality of the variant of the tensor to the second number of dimensions. In some examples, the system selects a dimension of the first number of dimensions of the tensor to "peel off" from the tensor to generate the variant of the tensor, with the selected dimension being a first dimension of the variant of the tensor. In some examples, the plurality of dimensions from the first number of dimensions of the tensor that are grouped represent a second dimension of the variant of the tensor. In some examples, the system iteratively and/or recursively repeats such a process, peeling off a different one of the first number of dimensions of the tensor with each iteration.

According some aspects, an apparatus for imaging is provided. The apparatus includes a memory and at least one processor (e.g., implemented in circuitry) coupled to the memory. The at least one processor is configured to and can: receive a tensor including a first number of dimensions; and process a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

In some aspects, a method of imaging is provided. The method includes: receiving a tensor including a first number of dimensions; and processing a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

In some aspects, a non-transitory computer-readable medium is provided that has stored thereon instructions that, when executed by at least one processor, cause the at least one processor to: receive a tensor including a first number of dimensions; and process a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

In some aspects, an apparatus for imaging is provided. The apparatus includes: means for receiving a tensor including a first number of dimensions; and means for processing a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

In some examples, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some examples, the apparatus includes a camera or multiple cameras for capturing one or more images. In some examples, the apparatus further includes a display for displaying one or more images, notifications, and/or other displayable data. In some examples, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 2 is a conceptual diagram illustrating a process for iteratively peeling off one dimension at a time from an 8-dimensional dataset and grouping remaining dimensions from the 8-dimensional dataset to process the 8-dimensional dataset using a 2-dimensional convolution function, in accordance with some examples;

FIG. 4 is a conceptual diagram illustrating pseudocode for an algorithm for a process for processing an input tensor X with a number of dimensions D using a convolution function with a number of dimensions $D_{target}$ to generate an output tensor Y, in accordance with some examples;

DETAILED DESCRIPTION

Figure 1:
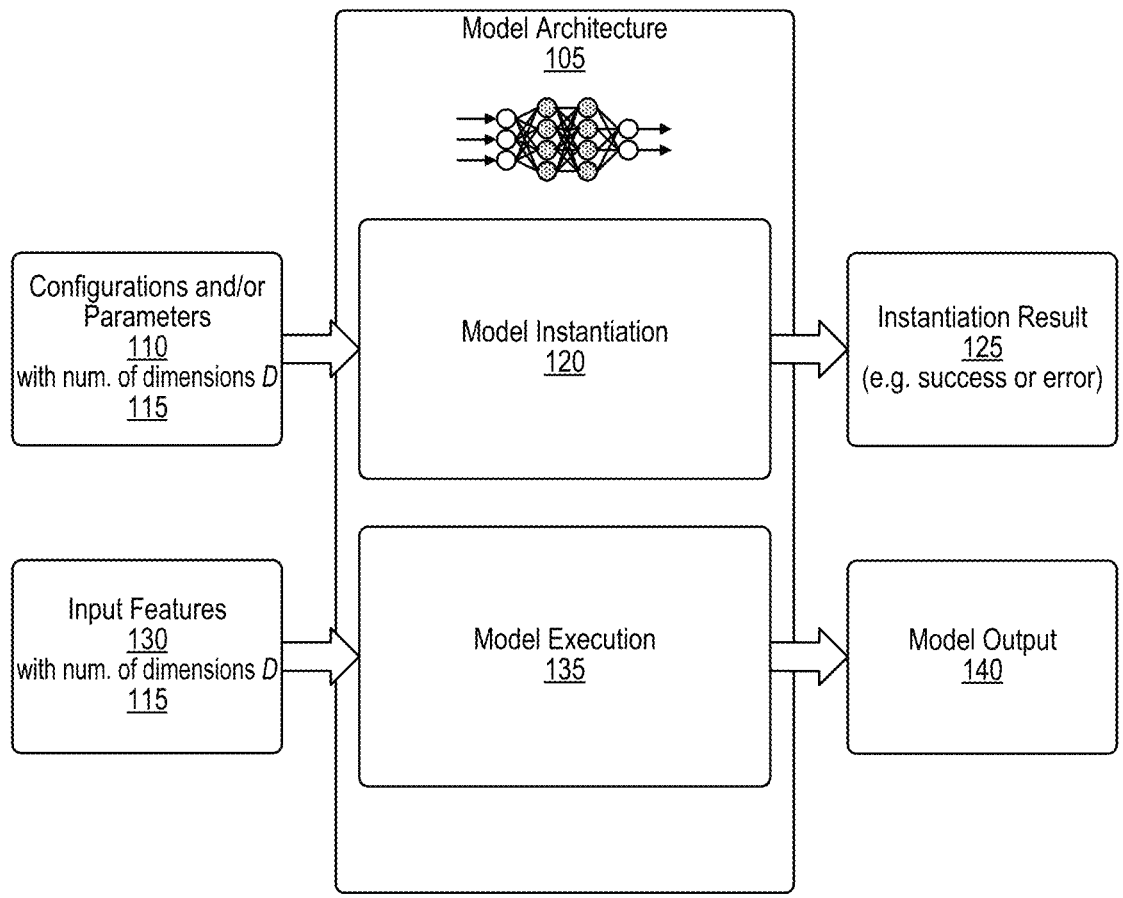
FIG. 1 is a block diagram illustrating a process for model instantiation and model execution using a model architecture, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Machine learning models are useful for a variety of tasks, including image processing, computer vision, natural language processing, and generating content. Machine learning models can be used to process tensors, such as 1-dimensional tensors (vectors), 2-dimensional tensors (matrices), or tensors with higher numbers of dimensions. Some machine learning models, such as convolutional neural networks (CNNs), use convolutional layers that process data (e.g., convolve the data). Convolutional layers are generally configured to accept data having a specific and limited number of dimensions. For instance, Conv2D is a two-dimensional convolution function or convolution layer. Conv3D is a three-dimensional convolution function or convolution layer. Few, if any, convolution functions or layers for more than three dimensions exist. Even Conv3D suffers from significant issues compared to Conv2D, with significantly higher computation complexity, higher memory space requirements, higher bandwidth usage, longer runtime, and more difficulty to parallelize (and/or gather scattered/sparse operands of large-volume tensors) especially in devices with limited amounts of tightly-coupled memory (TCM). Functions such as 3D MobileNet and 3D ShuffleNet are three-dimensional convolution functions or convolution layers that attempt to reduce dimensionality and can reduce total number of computations relative to Conv3D, but generally have an even longer runtime than Conv3D and are less capable of parallelization than Conv3D. Even top-end graphics processor units (GPUs), neural processing units (NPUs), and artificial intelligence (AI) accelerators are generally optimized for two-dimensional convolutions such as Conv2D rather than three-dimensional convolutions such as Conv3D. CNNs that use Conv2D or Conv3D traditionally cannot process tensors that have more than 3 dimensions.

Systems and techniques for recursive dimensional decomposition (RDD) convolution are described, for allowing a dataset with a first number of dimensions to be processed using a convolution function with a second number of dimensions that is lower than the first number of dimensions. In some examples, a system for dimensional decomposition convolution receives a tensor including a first number of dimensions. The system processes a variant of the tensor using a convolution function including a second number of dimensions to generate a processed tensor. The first number of dimensions is greater than the second number of dimensions. A plurality of dimensions from the first number of dimensions of the tensor are grouped into a dimension of the variant of the tensor to reduce dimensionality of the variant of the tensor to the second number of dimensions. In some examples, the system selects a dimension of the first number of dimensions of the tensor to "peel off" from the tensor to generate the variant of the tensor, with the selected dimension being a first dimension of the variant of the tensor. In some examples, the plurality of dimensions from the first number of dimensions of the tensor that are grouped represent a second dimension of the variant of the tensor. In some examples, the system iteratively and/or recursively repeats such a process, peeling off a different one of the first number of dimensions of the tensor with each iteration.

Certain techniques and systems are developing that rely on or benefit from higher-dimensionality convolutions and are made more efficient using RDD convolution. For instance, Neural Radiance Fields (NeRF) is a deep learning technique that generates 3D images of objects from 2D images. NeRF relies on natively on five-dimensional (5D) volumetric regression and representation to support photorealistic 3DR and synthesis. The five dimensions used in NeRF are (x, y, z, θ, ϕ), which are used for geometric regression and representation. Due to the processing of these 5-dimensional volumes, certain systems that perform convolution traditionally cannot run NeRF, or can run NeRF with very slow inference speed and long runtimes, especially for on-device NeRF. Use of recursive dimensional decomposition (RDD) convolution as discussed herein can allow efficient and fast high-dimensional tensor operations, making real-time on-device NeRF possible. Furthermore, while various techniques for 3D reconstruction, synthesis, SLAM, and geometry can be performed using techniques that rely on 3D convolutions or techniques that rely on 2D convolutions—the techniques that rely on 3D convolutions generally have significantly higher accuracy than the techniques that rely on 2D convolutions. Use of RDD convolution as discussed herein for these techniques can provide the benefits of these higher-accuracy techniques that rely on 3D convolutions, while providing efficiency, speed, and runtime improvements comparable to 2D convolutions. Another technique or system that benefits from higher-dimensionality convolutions and is made more efficient using RDD convolution, is depth from stereo (DFS), for instance used for 3D reconstruction, synthesis, simultaneous localization and mapping (SLAM), and/or geometry.

Various aspects of the application will be described with respect to the figures. FIG. 1 is a block diagram illustrating a process 100 for model instantiation 120 and model execution 135 using a model architecture 105. During the model instantiation 120, inputs are received indicating configurations and/or parameters 110 for the model, including a number of dimensions D 115, resulting in an instantiation result 125 (e.g., success, in which case the model is instantiated successfully, or failure, in which case the model is not instantiated). In an illustrative example, the number of dimensions D 115 is greater than 3, the model architecture 105 only supports 2-dimensional convolutions (e.g., via Conv2D) and/or 3-dimensional convolutions (e.g., via Conv3D), and the model architecture 105 does not implement the recursive dimensional decomposition (RDD) convolution discussed herein, in which case the model instantiation 120 fails (e.g., the instantiation result 125 is a failure). However, if the model architecture 105 implements RDD convolution as discussed herein, the number of dimensions D 115 can be arbitrarily high, even greater than 3, and the model instantiation 120 succeeds and the model is instantiated successfully (e.g., the instantiation result 125 is success).

At model execution 135, the model receives one or more input features 130 (e.g., tensor(s)) with a number of dimensions D 115. The model processes the one or more input features 130 (e.g., via the model execution 135) to produce a model output 140 (e.g., tensor). In an illustrative example, the number of dimensions D 115 is greater than 3, the model architecture 105 only supports 2-dimensional convolutions (e.g., via Conv2D) and/or 3-dimensional convolutions (e.g., via Conv3D), and the model architecture 105 does not implement the RDD convolution discussed herein, in which case the model execution 135 fails and the model output 140 is an error. However, if the model architecture 105 implements RDD convolution as discussed herein, the number of dimensions D 115 can be arbitrarily high, even greater than 3, and the model execution 135 succeeds in processing the one or more input features 130 to generate the model output 140.

A graphic representing the model architecture 105 is included in FIG. 1, illustrated as a set of circles connected to one another. Each of the circles can represent a node, a neuron, a perceptron, a layer, a portion thereof, or a combination thereof. The circles are arranged in columns. The leftmost column of white circles represents an input layer. The rightmost column of white circles represents an output layer. Two columns of shaded circled between the leftmost column of white circles and the rightmost column of white circles each represent hidden layers. The model architecture 105 can include more or fewer hidden layers than the two illustrated but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the model architecture 105 is trained and/or updated. In some cases, certain nodes (e.g., nodes of a hidden layer) can transform the information of each input node by applying activation functions (e.g., filters) to the input information, for instance applying convolutional functions, downscaling, upscaling, data transformation, and/or any other suitable functions.

Figure 2:
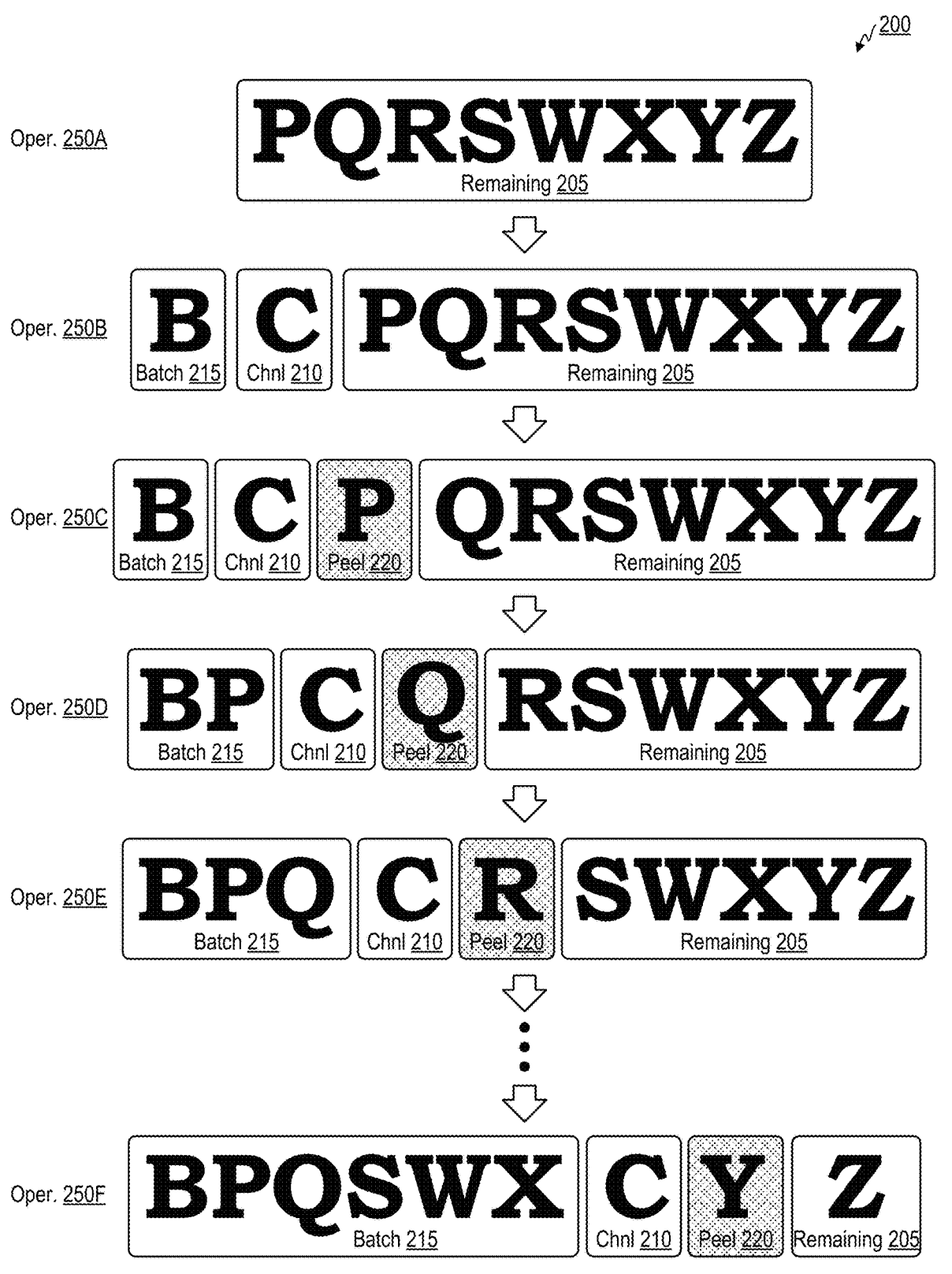

FIG. 2 is a conceptual diagram illustrating a process 200 for iteratively peeling off one dimension at a time from an 8-dimensional dataset (e.g., tensor) and grouping remaining dimensions from the 8-dimensional dataset to process the 8-dimensional dataset using a 2-dimensional convolution function. The 8 dimensions of the 8-dimensional dataset are represented by the letters P, Q, R, S, W, X, Y, and Z, respectively. The process 200 is performed using an RDD convolution system. The RDD convolution system may include, for instance, the model architecture 105 (FIG. 1), an RDD convolution system that performs the process 300 (FIG. 3), an RDD convolution system that performs the process 400 and/or runs the algorithm 410 (FIG. 4), the image capture and processing system 500 (FIG. 5), the neural network 600 (FIG. 6), the convolution system that performs the process 700 (FIG. 7), the computing system 800 (FIG. 8), or a combination thereof.

At operation 250A, the RDD convolution system (or a component thereof) is configured to, and can, categorize all 8 dimensions of the 8-dimensional dataset under a remaining group 205 indicating dimensions that still remain to be processed. Thus, at operation 250A, the remaining group 205 includes dimensions P, Q, R, S, W, X, Y, and Z. At operation 250B, the RDD convolution system (or a component thereof) is configured to, and can, allocate a channel dimension 210 (C) and a batch dimension 215 (B) to be used as part of the process 200.

At operation 250C, the RDD convolution system (or a component thereof) is configured to, and can, select the "P" dimension to "peel" away from the 8 dimensions of the 8-dimensional dataset into a peel dimension 220, illustrated as a box with halftone shading. Thus, at operation 250C, the remaining group 205 includes the remaining 7 unprocessed dimensions Q, R, S, W, X, Y, and Z. At operation 250C, the RDD convolution system (or a component thereof) is configured to, and can, process a variant of the 8-dimensional dataset using a 2-dimensional convolution (e.g., Conv2D). In some examples, the "P" dimension in the peel dimension 220 represents a first dimension (e.g., a height) of the variant, while the other dimensions (e.g., including the remaining group 205, the channel dimension 210, and/or the batch dimension 215), grouped together, represent a second dimension (e.g., a width) of the variant. Generating the variant can be referred to as reshaping the 8-dimensional dataset, and the variant can be referred to as a reshaped dataset or reshaped tensor. By the end of the operation 250C the "P" dimension that is in the peel dimension 220 at operation 250C is considered processed, as the "P" dimension is uniquely convolved, while the remaining 7 dimensions in the remaining group are convolved collectively (e.g., not uniquely). The remaining group can be referred to as the remaining dimension.

In some examples, the RDD convolution system may order dimensions according to Batch Channel Height Width (BCHW) order, Batch Channel Width Height (BCWH) order, another order, or a combination thereof. The process 200 of FIG. 2 is illustrated as using BCHW order, but it should be understood that the process 200 could use BCWH instead. In some examples, the order can be based on a machine learning framework to be used with the RDD convolution system. For instance, in an illustrative example, BCHW ordering can be used with a PyTorch machine learning framework, while BCWH ordering can be used with a Tensorflow machine learning framework.

At operation 250D, the RDD convolution system (or a component thereof) is configured to, and can, aggregate the processed "P" dimension that was in the peel dimension 220 at operation 250C into the batch dimension 215, so that the batch dimension 215 now includes the processed "P" dimension at operation 250D. At operation 250D, the RDD convolution system (or a component thereof) is configured to, and can, select the "Q" dimension to peel away, into the peel dimension 220, from the 7 dimensions that were in the remaining group 205 as of the operation 250C. Thus, at operation 250D, the remaining group 205 includes the remaining 6 unprocessed dimensions R, S, W, X, Y, and Z. At operation 250D, the RDD convolution system (or a component thereof) is configured to, and can, process a variant of the 8-dimensional dataset (e.g., a reshaped tensor) using a 2-dimensional convolution (e.g., Conv2D). In some examples, the "Q" dimension in the peel dimension 220 represents a first dimension (e.g., a height) of the variant, while the other dimensions (e.g., including the remaining group 205, the channel dimension 210, and/or the batch dimension 215), grouped together, represent a second dimension (e.g., a width) of the variant. By the end of the operation 250D the "Q" dimension that is in the peel dimension 220 at operation 250D is considered processed, as the "Q" dimension is uniquely convolved, while the remaining 6 dimensions in the remaining group are convolved collectively (e.g., not uniquely).

At operation 250E, the RDD convolution system (or a component thereof) is configured to, and can, aggregate the processed "Q" dimension that was in the peel dimension 220 at operation 250D into the batch dimension 215, so that the batch dimension 215 now includes the processed "P" and "Q" dimensions at operation 250E. At operation 250E, the RDD convolution system (or a component thereof) is configured to, and can, select the "R" dimension to peel away, into the peel dimension 220, from the 6 dimensions that were in the remaining group 205 as of the operation 250D. Thus, at operation 250E, the remaining group 205 includes the remaining 5 unprocessed dimensions S, W, X, Y, and Z. At operation 250E, the RDD convolution system (or a component thereof) is configured to, and can, process a variant of the 8-dimensional dataset (e.g., a reshaped tensor) using a 2-dimensional convolution (e.g., Conv2D). In some examples, the "R" dimension in the peel dimension 220 represents a first dimension (e.g., a height) of the variant, while the other dimensions (e.g., including the remaining group 205, the channel dimension 210, and/or the batch dimension 215), grouped together, represent a second dimension (e.g., a width) of the variant. By the end of the operation 250E the "R" dimension that is in the peel dimension 220 at operation 250E is considered processed, as the "R" dimension is uniquely convolved, while the remaining 5 dimensions in the remaining group are convolved collectively (e.g., not uniquely).

The RDD convolution system (or a component thereof) is configured to, and can, perform several more iterations or recursions, each time peeling away another dimension from the remaining group 205 into the peel dimension 220 and processing a variant of the 8-dimensional dataset using a 2-dimensional convolution (e.g., Conv2D) with the selected dimension in the peel dimension 220 represents a first dimension (e.g., a height) of the variant, while the other dimensions (e.g., including the remaining group 205, the channel dimension 210, and/or the batch dimension 215), grouped together, representing a second dimension (e.g., a width) of the variant. Each time, the resulting processed dimension is moved from the peel dimension 220 to the batch dimension 215. For instance, in an illustrative example, after the operation 250E, the RDD convolution system (or a component thereof) is configured to, and can, peel away the "S" dimension, the "W" dimension, and the "X" dimension as discussed with respect to the "P," "Q," and "R" dimensions in operations 250C-250E.

At operation 250F, the RDD convolution system (or a component thereof) is configured to, and can, aggregate, into the batch dimension 215, the processed "S," "W," and "X" dimensions that were selected for the peel dimension 220 and processed after operation 250E, Thus, as of the operation 250F, the batch dimension 215 now includes the processed "P," "Q," "R," "S," "W," and "X" dimensions. At operation 250F, the RDD convolution system (or a component thereof) is configured to, and can, select the "Y" dimension to peel away, into the peel dimension 220, from the remaining group 205. Thus, at operation 250F, the remaining group 205 only includes the last remaining unprocessed dimension Z. At operation 250E, the RDD convolution system (or a component thereof) is configured to, and can, process a variant of the 8-dimensional dataset (e.g., a reshaped tensor) using a 2-dimensional convolution (e.g., Conv2D). In some examples, the "Y" dimension in the peel dimension 220 represents a first dimension (e.g., a height) of the variant, while the other dimensions (e.g., including the remaining group 205, the channel dimension 210, and/or the batch dimension 215), grouped together, represent a second dimension (e.g., a width) of the variant. By the end of the operation 250F the "Y" dimension that is in the peel dimension 220 at operation 250F is considered processed and uniquely convolved. In some examples, the "Z" dimension is processed (e.g., uniquely convolved) in operation 250F as part of processing the "Y" dimension in the peel dimension 220, for instance because a target number of dimensions corresponding to the convolution function or layer (e.g., Conv2D) has been reached, with Y and Z representing 2 dimensions.

In some examples, the RDD convolution system (or a component thereof) is configured to, and can, perform another operation to process (e.g., uniquely convolve) the "Z" dimension from the remaining group 205. For instance, the processed "Y" dimension can be aggregated into the batch dimension 215, and the "Z" dimension can be selected to peel away into the peel dimension 220. In such examples, the RDD convolution system (or a component thereof) is configured to, and can, process a variant of the 8-dimensional dataset (e.g., a reshaped tensor) using a 2-dimensional convolution (e.g., Conv2D), with the "Z" dimension in the peel dimension 220 representing a first dimension (e.g., a height) of the variant, while the other dimensions (e.g., including the channel dimension 210 and/or the batch dimension 215 now that the remaining group 205 is empty), grouped together, representing a second dimension (e.g., a width) of the variant. In this way, the "Z" dimension that is in the peel dimension 220 can be processed and uniquely convolved.

In some examples, the RDD convolution system (or a component thereof) is configured to, and can, identify an efficient dimensionality order for training and/or inference execution for a target accelerator and/or engine. Given a dimensionality order (that is higher than the efficient order of the target) of the input feature tensor for convolution along with a set of parameters for configuration, the RDD convolution system (or a component thereof) can apply RDD convolution to instantiate a machine learning model (e.g., as in the model instantiation 120) for later execution (e.g., as in the model execution 135). In terms of the model architecture 105, in some examples, once a model is instantiated (e.g., as in the model instantiation 120), the process 200 for RDD convolution injects a high-dimensional input tensor (e.g., input features 130) to the instantiated model for training or inference and collect the model output 140. To apply RDD convolution, in some examples, a system can instantiate a static model that takes a pre-defined (high) order of dimensionality, can instantiate a dynamic model that takes an arbitrary (high) order of dimensionality but rely on dynamic input of the dimensionality order info for the model to execute in run time, or a combination thereof. RDD convolution can be applied in the form of an arithmetic algorithm, a model architecture, an AI accelerator engine, or a combination thereof.

Figure 3:
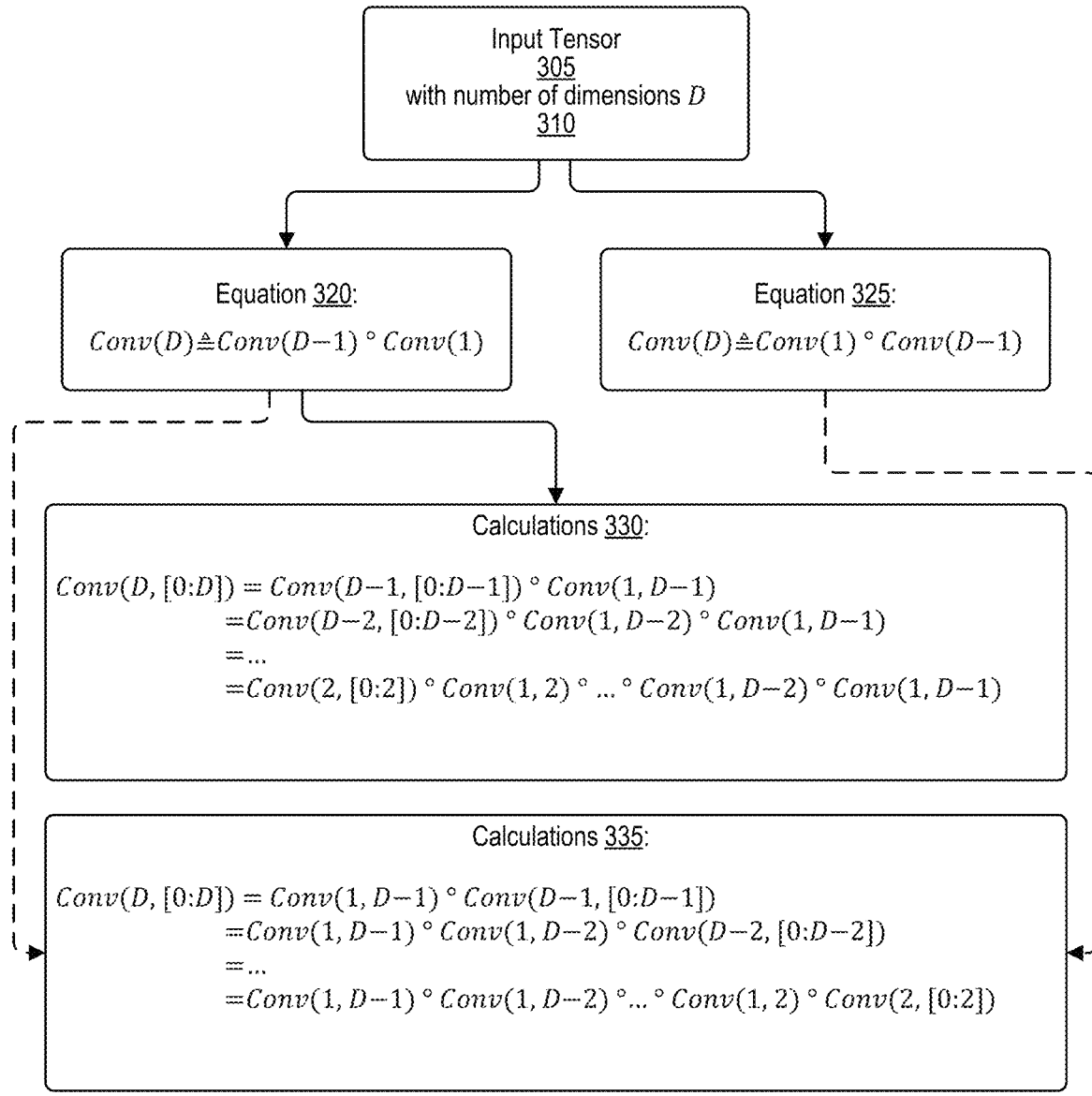
FIG. 3 is a flow diagram illustrating equations and corresponding calculations that can be used to process an input tensor with a number of dimensions D using at least one lower-dimensionality convolution function, in accordance with some examples.

FIG. 3 is a flow diagram illustrating a process 300 for using equations 320-325 and corresponding calculations 330-335 to process an input tensor 305 with a number of dimensions D 310 using at least one lower-dimensionality convolution function. The process 300 is performed using an RDD convolution system. The RDD convolution system may include, for instance, the model architecture 105 (FIG. 1), an RDD convolution system that performs the process 200 (FIG. 2), an RDD convolution system that performs the process 400 and/or runs the algorithm 410 (FIG. 4), the image capture and processing system 500 (FIG. 5), the neural network 600 (FIG. 6), the convolution system that performs the process 700 (FIG. 7), the computing system 800 (FIG. 8), or a combination thereof. In some examples, the number of dimensions D 310 is greater than or equal to 3 (D≥3). In some examples, the number of dimensions D 310 is greater than 3 (D>3). The at least one lower-dimensionality convolution function can include at least one convolution function that convolves tensor(s) over a number of dimensions that is less than the number of dimensions D 310 of the input tensor 305. For instance, in some examples, the at least one lower-dimensionality convolution function can include a 3-dimensional convolution function or layer (e.g., Conv3D), a 2-dimensional convolution function or layer (e.g., Conv2D), a 1-dimensional convolution function or layer, or a combination thereof.

As a first operation in the process 300, the RDD convolution system instantiates a function and/or model, as in the model instantiation 120. The RDD convolution system receives the input tensor 305 with the number of dimensions D 310.

In a first illustrative example, to process the input tensor 305 with the number of dimensions D 310 using the at least one lower-dimensionality convolution function (e.g., Conv2D), the RDD convolution system uses the equation 320, applied using the calculations 330 and/or the calculations 335. The equation 320 is identified as:

$$Conv(D) \triangleq Conv(D-1) \circ Conv(1) \qquad \text{Equation 320}$$

In a second illustrative example, to process the input tensor 305 with the number of dimensions D 310 using the at least one lower-dimensionality convolution function (e.g., Conv2D), the RDD convolution system uses the equation 325. The equation 325 is identified as:

$$Conv(D) \triangleq Conv(1) \circ (D-1) \qquad \text{Equation 325}$$

In the equation 320 and the equation 325, the symbol "∘" represents function cascading. For instance, the equation 320 and the equation 325 are applied recursively to each of the D dimensions of the input tensor 305 until a target dimensionality is reached. The target dimensionality can represent a lower number of dimensions than the number of dimensions D 310, such as number of dimensions of the at least one lower-dimensionality convolution function (e.g., 2 dimensions corresponding to Conv2D or another 2-dimensional convolution function or layer).

For instance, in the equation 325, a single dimension (e.g., the first dimension 1) is selected to peel off from the dimensions D and processed, with the remaining D−1 dimensions still to be processed. For instance, in terms of the process 200 (of FIG. 2), dimension 1 may be an example of dimension Q that is peeled off in operation 250C. In each subsequent iteration, another dimension (e.g., the second dimension 2) is selected and processed, with the remaining D−2 dimensions still to be processed, which continues on recursively until all D dimensions of the input tensor 305 are processed. For instance, if D=5, the equation 325 may read Conv(5)≜Conv(1)°Conv(4) in a first iteration. In a second iteration of the equation 325, the Conv(4) from the first iteration is broken down further into Conv(4)≜Conv(1)°Conv(3). In a third iteration of the equation 325, the Conv(3) from the second iteration is broken down further into Conv(3)≜Conv(1)°Conv(2), and so forth.

Similarly, in the equation 320, a single dimension (e.g., the last dimension D) is selected to peel off from the dimensions D and processed, with the remaining D−1 dimensions still to be processed. For instance, in terms of the process 200 (of FIG. 2), peeling off dimension D may be akin to peeling of dimension Z first at operation 250C, rather than peeling of dimension Q at operation 250C. In each subsequent iteration, another dimension (e.g., the second to last dimension D−1) is selected and processed, with the remaining D−2 dimensions still to be processed, which continues on recursively until all D dimensions of the input tensor 305 are processed. For instance, if D=5, the equation 320 may read Conv(5)≜Conv(4)°Conv(1) in a first iteration. In a second iteration of the equation 320, the Conv(4) from the first iteration is broken down further into Conv(4)≜Conv(3)°Conv(1). In a third iteration of the equation 320, the Conv(3) from the second iteration is broken down further into Conv(3)≜Conv(2)°Conv(1), and so forth.

Ultimately, whether the equation 320 or the equation 325 is used, the same number of convolutions are generally calculated, but the order of those calculations may be different. As such, it may be helpful to choose the equation 320 over the equation 325, or vice versa, to optimize calculations in certain situations (e.g., based on the specific hardware used or application(s) for which the convolutions are being calculated). In some examples, the RDD convolution system can also transpose the input tensor 305 in different ways and/or in different orders. In some examples, transposing the input tensor 305 in a reverse order while using equation 320 may be akin to applying equation 325. Similarly, transposing the input tensor 305 in a reverse order while using equation 322 may be akin to applying equation 320. In some examples, the RDD convolution system can use a combination of the equation 320 and the equation 325.

The calculations 330 and the calculations 335 represent recursive applications of the equation 320. In some examples, the calculations 335 can represent recursive application of the equation 325. In the calculations 330 and the calculations 335, Conv(d, [i: j]) represents for a d-dimensional convolution over the i-th dimension through the (j−1)-th dimension (not including the j-th dimension) out of the D dimensions of the original input tensor 305, where d≤D. In the calculations 330 and the calculations 335, convolutions in which the dimensionality d of the convolution is less than or equal to a target dimensionality of the at least one lower-dimensionality convolution function (e.g., 2D as in Conv2D, 3D as in Conv3D, or 1D) is performed using the at least one lower-dimensionality convolution function. On the other hand, convolutions in which the dimensionality d of the convolution is greater than a target dimensionality of the at least one lower-dimensionality convolution function (e.g., 2D as in Conv2D, 3D as in Conv3D, or 1D) is decomposed further, recursively, until the dimensionality d of the resulting convolutions is less than or equal to a target dimensionality of the at least one lower-dimensionality convolution function.

For instance, if D=5, the calculations 330 indicate that a 5-dimensional convolution of dimensions 0 through D is equivalent to a 4-dimensional convolution of dimensions 0 through 3 cascaded to a 1-dimensional convolution of the fourth dimension. Such an operation is in turn equivalent to a 3-dimensional convolution of dimensions 0 through 2 cascaded to a 1-dimensional convolution of the third dimension and the 1-dimensional convolution of the fourth dimension. The operation is in turn equivalent to a 2-dimensional convolution of dimensions 0 and 1 cascaded to a 1-dimensional convolution of the second dimension, the 1-dimensional convolution of the third dimension, and the 1-dimensional convolution of the fourth dimension. Assuming a target dimensionality of 2, the 2-dimensional convolution of dimensions 0 and 1 can be performed using a 2-dimensional convolution function, and the remaining convolutions can be performed using a 1-dimensional convolution function. In this way, a 5-dimensional convolution of a 5-dimensional tensor can be performed using a set of 2-dimensional and 1-dimensional convolutions according to the equation 320 and the calculations 330.

Similarly, if D=5, the calculations 335 indicate that a 5-dimensional convolution of dimensions 0 through D is equivalent to a 1-dimensional convolution of the fourth dimension cascaded to a 4-dimensional convolution of dimensions 0 through 3. This is in turn equivalent to the 1-dimensional convolution of the fourth dimension cascaded to a 1-dimensional convolution of the third dimension and a 3-dimensional convolution of dimensions 0 through 2. This is in turn equivalent to the 1-dimensional convolution of the fourth dimension cascaded to the 1-dimensional convolution of the third dimension, a 1-dimensional convolution of the second dimension, and a 2-dimensional convolution of dimensions 0 and 1. Assuming a target dimensionality of 2, the 2-dimensional convolution of dimensions 0 and 1 can be performed using a 2-dimensional convolution function, and the remaining convolutions can be performed using a 1-dimensional convolution function. In this way, a 5-dimensional convolution of a 5-dimensional tensor can be performed using a set of 2-dimensional and 1-dimensional convolutions according to the equation 320 and the calculations 335.

In some examples, during the function instantiation or model instantiation, the RDD convolution system can receive and/or determine the d-dimensional kernels for each d-dimensional convolution function. For instance, given D as the dimensionality of the input tensor 305 (e.g., pre-RDD), the RDD convolution system can instantiate Conv(d, [0: d]), where d≤D, with a d-dimensional kernel [$k_0$, $k_0$ ..., $k_{d-1}$], where $k_i$>0. For example, given D=4, the RDD convolution system can instantiate Conv(3, [0: 3]) with a kernel of [3,5,5]. Moving on to function execution, after instantiating the RDD convolution function according to the arguments of function dimensions and dimension indices, given a tensor $X_D$ of dimension D, the RDD convolution system can feed $X_D$ into the instantiated Conv(D, [0: D]) and perform the RDD convolution function according to equation 320, equation 325, calculations 330, and/or calculations 335. The tensor $X_D$ can be an example of the input tensor 305.

FIG. 4 is a conceptual diagram illustrating pseudocode for an algorithm 410 for a process 400 for processing an input tensor X 405 with a number of dimensions D using a convolution function with a number of dimensions $D_{target}$ to generate an output tensor Y 415. The process 400 is performed using an RDD convolution system. The RDD convolution system may include, for instance, the model architecture 105 (FIG. 1), an RDD convolution system that performs the process 200 (FIG. 2), an RDD convolution system that performs the process 300 (FIG. 3), the image capture and processing system 500 (FIG. 5), the neural network 600 (FIG. 6), the convolution system that performs the process 700 (FIG. 7), the computing system 800 (FIG. 8), or a combination thereof. In the context of FIG. 4, $D_{target}$<D. The input tensor X 405 has a shape [$s_i$], with i=0, 1, ..., D−1. The output tensor Y 415 has a shape [$s_o$], with o=0, 1, ..., D−1.

Stage 420 of the algorithm 410 performs function instantiation (e.g., model instantiation 120) for a function $f(d)$. The function $f(d)$ is initialized as a no-operation (NOP) function. A variable b represents a tensor size in the batch dimension 215, instantiated at $s_o$, representing the shape and/or size matching the shape and/or size of the shape and/or size the output tensor Y 415. In some examples, the variable b is instantiated at instantiated at $s_i$, representing the shape and/or size matching the shape and/or size of the shape and/or size the input tensor X 405.

The stage 420 of the algorithm 410 includes a for loop in which the dimension variable d loops from D (the number of dimensions of the input tensor X 405) to $D_{target}$ (the number of dimensions of the convolution function to use). The RDD convolution system assigns an argument tuple $\alpha_{d-1}$=($k_i$, $s_i$, $p_i$) for dimension d−1, with $k_i$, $s_i$, and $p_i$ representing the kernel, strike, and pad, respectfully. The argument tuple $\alpha_{d-1}$ is used by the RDD convolution system as convolution configuration arguments in the equation 320 and/or the equation 325. A recursive update for the equation 320 is indicated in the algorithm 410 as $f(d)$=Conv(d−1,[0:d−1])°Conv(1, $\alpha_{d-1}$)°$f(d)$. A recursive update for the equation 325 is indicated in the algorithm 410 as $f(d)$=$f(d)$°Conv(d−1, [0:d−1])°Conv(1, $\alpha_{d-1}$). The RDD convolution system transposes the dimension d−1 to move the dimension to be next to batch dimension 0. The RDD convolution system calculates an aggregated size of the peeled and batch dimensions and reshapes the aggregated peeled unit-kernel and batch dimensions.

Outside of the for loop, the algorithm 410 includes an update for the equation 320 for the number of dimensions $D_{target}$, indicated as $f(d)=Conv(D_{target})°f(d)$. Outside of the for loop, the algorithm 410 includes an update for the equation 325 for the number of dimensions $D_{target}$, indicated as $f(d)=f(d)°Conv(D_{target})$. The stage 420 of the algorithm 410 returns the instantiated function $f(d)$. Note that while updates are included in the algorithm 410 for both the equation 320 and the equation 325, in some examples, the algorithm performs the identified updates for one of the equation 320 or the equation 325.

Stage 425 of the algorithm 410 performs function execution (e.g., model execution 135) for the function $f(d)$, for training and/or for inference. The input tensor X 405 is stored in a variable x, which is passed to the function instantiated at stage 420, now identified as $f_d(\ )$. The RDD convolution system calculates the output tensor Y 415 using the calculation $Y=f_d(x)$ with the function $f_d(\ )$ that was instantiated in stage 420.

Figure 5:
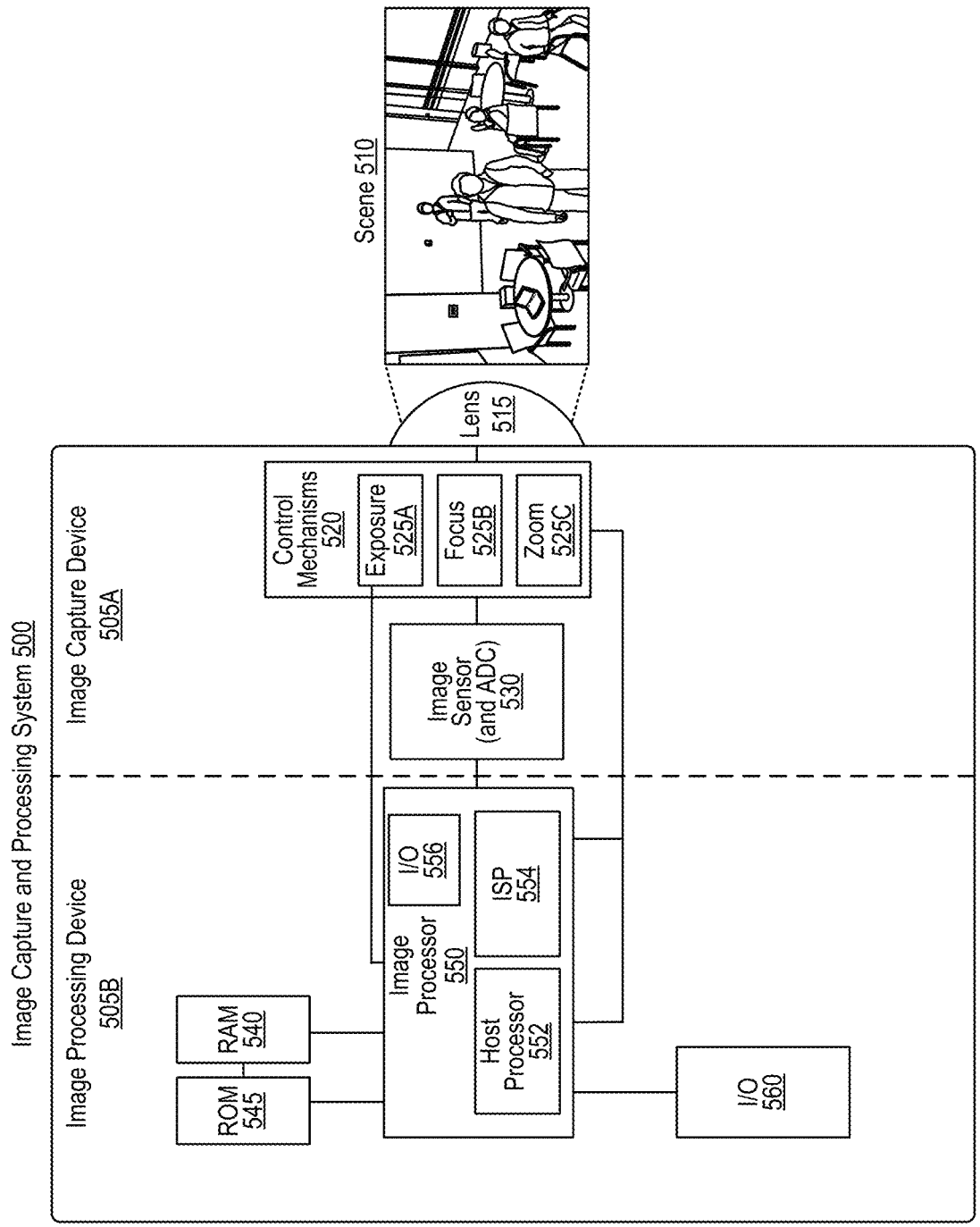
FIG. 5 is a block diagram illustrating an example architecture of an image capture and processing system that can capture and provide input image data that can be processed using recursive dimensional decomposition (RDD) convolution to generate processed image data, in accordance with some examples.

FIG. 5 is a block diagram illustrating an architecture of an image capture and processing system 500 that can capture and provide input image data that can be processed using recursive dimensional decomposition (RDD) convolution to generate processed image data. The image capture and processing system 500 includes various components that are used to capture and process images of one or more scenes (e.g., an image of a scene 510). The image capture and processing system 500 can capture standalone images (or photographs) and/or can capture videos that include multiple images (or video frames) in a particular sequence. A lens 515 of the system 500 faces a scene 510 and receives light from the scene 510. The lens 515 bends the light toward the image sensor 530. The light received by the lens 515 passes through an aperture controlled by one or more control mechanisms 520 and is received by an image sensor 530. In some examples, the scene 510 is a scene in an environment. In some examples, the image capture and processing system 500 is coupled to, and/or part of, a vehicle 590, and the scene 510 is a scene in an environment around the vehicle 590. In some examples, the scene 510 is a scene of at least a portion of a user. For instance, the scene 510 can be a scene of one or both of the user's eyes, and/or at least a portion of the user's face.

The one or more control mechanisms 520 may control exposure, focus, and/or zoom based on information from the image sensor 530 and/or based on information from the image processor 550. The one or more control mechanisms 520 may include multiple mechanisms and components; for instance, the control mechanisms 520 may include one or more exposure control mechanisms 525A, one or more focus control mechanisms 525B, and/or one or more zoom control mechanisms 525C. The one or more control mechanisms 520 may also include additional control mechanisms besides those that are illustrated, such as control mechanisms controlling analog gain, flash, HDR, depth of field, and/or other image capture properties.

The focus control mechanism 525B of the control mechanisms 520 can obtain a focus setting. In some examples, focus control mechanism 525B store the focus setting in a memory register. Based on the focus setting, the focus control mechanism 525B can adjust the position of the lens 515 relative to the position of the image sensor 530. For example, based on the focus setting, the focus control mechanism 525B can move the lens 515 closer to the image sensor 530 or farther from the image sensor 530 by actuating a motor or servo, thereby adjusting focus. In some cases, additional lenses may be included in the system 500, such as one or more microlenses over each photodiode of the image sensor 530, which each bend the light received from the lens 515 toward the corresponding photodiode before the light reaches the photodiode. The focus setting may be determined via contrast detection autofocus (CDAF), phase detection autofocus (PDAF), or some combination thereof. The focus setting may be determined using the control mechanism 520, the image sensor 530, and/or the image processor 550. The focus setting may be referred to as an image capture setting and/or an image processing setting.

The exposure control mechanism 525A of the control mechanisms 520 can obtain an exposure setting. In some cases, the exposure control mechanism 525A stores the exposure setting in a memory register. Based on the exposure setting, the exposure control mechanism 525A can control a size of the aperture (e.g., aperture size or f/stop), a duration of time for which the aperture is open (e.g., exposure time or shutter speed), a sensitivity of the image sensor 530 (e.g., ISO speed or film speed), analog gain applied by the image sensor 530, or any combination thereof. The exposure setting may be referred to as an image capture setting and/or an image processing setting. In some examples, an exposure setting can be provided to the exposure control mechanism 525A of the control mechanisms 520 from the image processor 550, the host processor 552, the ISP 554, or a combination thereof.

The zoom control mechanism 525C of the control mechanisms 520 can obtain a zoom setting. In some examples, the zoom control mechanism 525C stores the zoom setting in a memory register. Based on the zoom setting, the zoom control mechanism 525C can control a focal length of an assembly of lens elements (lens assembly) that includes the lens 515 and one or more additional lenses. For example, the zoom control mechanism 525C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 515 in some cases) that receives the light from the scene 510 first, with the light then passing through an afocal zoom system between the focusing lens (e.g., lens 515) and the image sensor 530 before the light reaches the image sensor 530. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 525C moves one or more of the lenses in the afocal zoom system, such as the negative lens and one or both of the positive lenses.

The image sensor 530 includes one or more arrays of photodiodes or other photosensitive elements. Each photodiode measures an amount of light that eventually corresponds to a particular pixel in the image produced by the image sensor 530. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 530 may alternately or additionally include opaque and/or reflective masks that block light from reaching certain photodiodes, or portions of certain photodiodes, at certain times and/or from certain angles, which may be used for phase detection autofocus (PDAF). The image sensor 530 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 520 may be included instead or additionally in the image sensor 530. The image sensor 530 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 8:
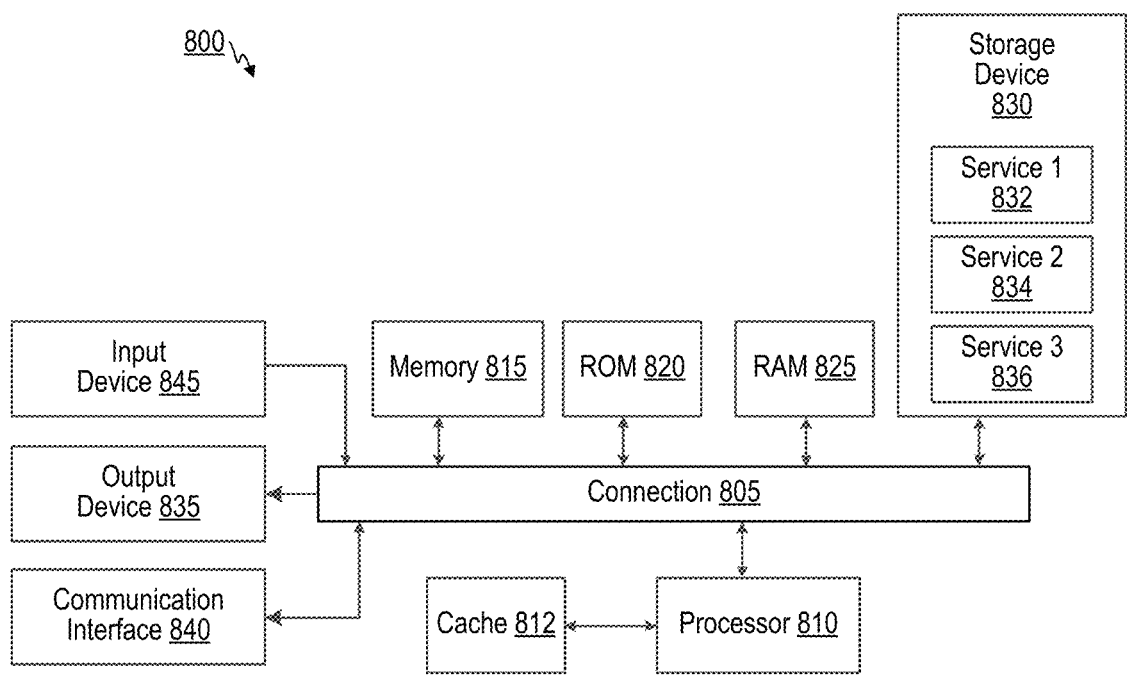
FIG. 8 is a diagram illustrating an example of a computing system for implementing certain aspects described herein.

The image processor 550 may include one or more processors, such as one or more image signal processors (ISPs) (including ISP 554), one or more host processors (including host processor 552), and/or one or more of any other type of processor 810 (of FIG. 8) discussed with respect to the computing system 800 (of FIG. 8). The host processor 552 can be a digital signal processor (DSP) and/or other type of processor. In some implementations, the image processor 550 is a single integrated circuit or chip (e.g., referred to as a system-on-chip or SoC) that includes the host processor 552 and the ISP 554. In some cases, the chip can also include one or more input/output ports (e.g., input/output (I/O) ports 556), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 556 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In some examples, the host processor 552 can communicate with the image sensor 530 using an I2C port, and the ISP 554 can communicate with the image sensor 530 using an MIPI port.

The image processor 550 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 550 may store image frames and/or processed images in random access memory (RAM) 540 (and/or RAM 820 of FIG. 8), read-only memory (ROM) 545 (and/or ROM 825 of FIG. 8), a cache (e.g., cache 812 of FIG. 8), a memory unit, another storage device, or some combination thereof.

Various input/output (I/O) devices 560 may be connected to the image processor 550. The I/O devices 560 can include a display screen, a keyboard, a keypad, a touchscreen, a trackpad, a touch-sensitive surface, a printer, any other output devices 835 (of FIG. 8), any other input devices 845 (of FIG. 8), or some combination thereof. In some cases, a caption may be input into the image processing device 505B through a physical keyboard or keypad of the I/O devices 560, or through a virtual keyboard or keypad of a touchscreen of the I/O devices 560. The I/O devices 560 may include one or more ports, jacks, or other connectors that enable a wired connection between the system 500 and one or more peripheral devices, over which the system 500 may receive data from the one or more peripheral device and/or transmit data to the one or more peripheral devices. The I/O devices 560 may include one or more wireless transceivers that enable a wireless connection between the system 500 and one or more peripheral devices, over which the system 500 may receive data from the one or more peripheral device and/or transmit data to the one or more peripheral devices. The peripheral devices may include any of the previously discussed types of I/O devices 560 and may themselves be considered I/O devices 560 once they are coupled to the ports, jacks, wireless transceivers, or other wired and/or wireless connectors.

In some cases, the image capture and processing system 500 may be a single device. In some cases, the image capture and processing system 500 may be two or more separate devices, including an image capture device 505A (e.g., a camera) and an image processing device 505B (e.g., a computing device coupled to the camera). In some implementations, the image capture device 505A and the image processing device 505B may be coupled together, for example via one or more wires, cables, or other electrical connectors, and/or wirelessly via one or more wireless transceivers. In some implementations, the image capture device 505A and the image processing device 505B may be disconnected from one another.

As shown in FIG. 5, a vertical dashed line divides the image capture and processing system 500 of FIG. 1 into two portions that represent the image capture device 505A and the image processing device 505B, respectively. The image capture device 505A includes the lens 515, control mechanisms 520, and the image sensor 530. The image processing device 505B includes the image processor 550 (including the ISP 554 and the host processor 552), the RAM 540, the ROM 545, and the I/O devices 560. In some cases, certain components illustrated in the image capture device 505A, such as the ISP 554 and/or the host processor 552, may be included in the image capture device 505A.

The image capture and processing system 500 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 500 can include one or more wireless transceivers for wireless communications, such as cellular network communications, 802.11 wi-fi communications, wireless local area network (WLAN) communications, or some combination thereof. In some implementations, the image capture device 505A and the image processing device 505B can be different devices. For instance, the image capture device 505A can include a camera device and the image processing device 505B can include a computing device, such as a mobile handset, a desktop computer, or other computing device.

While the image capture and processing system 500 is shown to include certain components, one of ordinary skill will appreciate that the image capture and processing system 500 can include more components than those shown in FIG. 5. The components of the image capture and processing system 500 can include software, hardware, or one or more combinations of software and hardware. For example, in some implementations, the components of the image capture and processing system 500 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 500.

In some examples, image data captured using the image capture and processing system 500 can be processed using recursive dimensional decomposition (RDD) convolution to generate processed image data. For instance, image data captured using the image capture and processing system 500 can be included in, or be a basis of, the input features 130, the 8-dimensional dataset of FIG. 2, the input tensor 305, the input tensor X 405, input data that is input to the neural network (NN) 600 through the input layer 610, the tensor received in operation 705, an input received to a trained machine learning model running on the computing system 800, or a combination thereof. In some examples, the image processing device 505B (e.g., the image processor 550, the host processor 552, and/or the ISP 554) can process image data captured by the image capture device 505A (e.g., by the image sensor 530) using RDD convolution as discussed herein.

Figure 6:
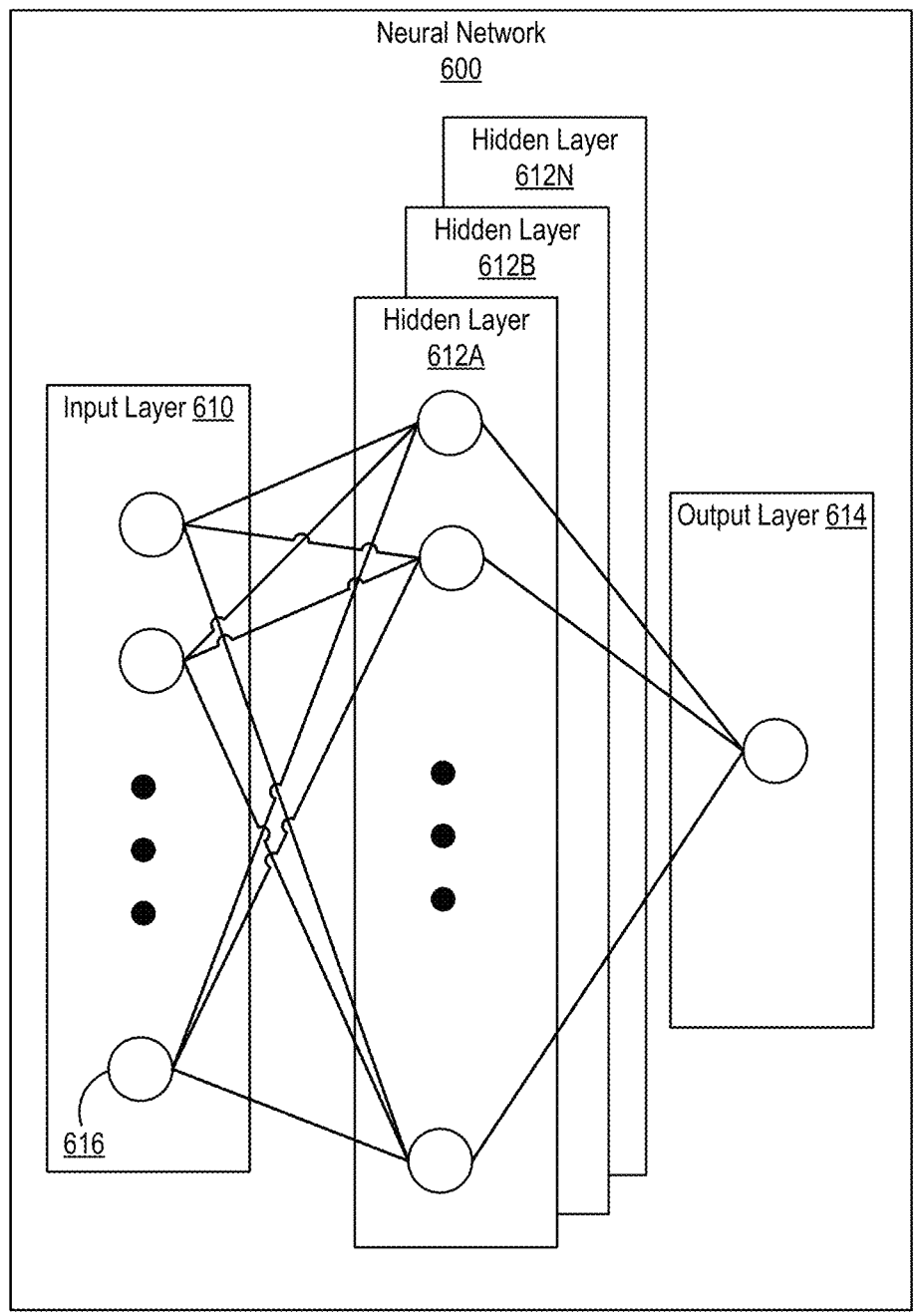
FIG. 6 is a block diagram illustrating an example of a neural network that can be used for dimensional decomposition convolution, in accordance with some examples.

FIG. 6 is a block diagram illustrating an example of a neural network (NN) 600 that can be used for dimensional decomposition convolution. With reference to FIGS. 1-6, the neural network 600 can include any type of deep network, such as a convolutional neural network (CNN), an autoencoder, a deep belief net (DBN), a Recurrent Neural Network (RNN), a Generative Adversarial Networks (GAN), and/or other type of neural network. In some examples, the neural network 600 can be used to implement recursive dimensional decomposition (RDD) convolution as discussed herein. For instance, with reference to FIGS. 1-6, the neural network 600 may be an example of a model implementing the model architecture 105, a model instantiated using the modem instantiation 120, a model that is characterized by the configurations and/or parameters 110, a model that executes as in the model execution 135, a model that processes the input features 130 to generate the model output 140 (FIG. 1), a model that processes the 8-dimensional dataset as in the process 200 (FIG. 2), a model that implements RDD convolution according to the equation 320, a model that implements RDD convolution according to the equation 325, a model that implements RDD convolution according to the calculations 330, a model that implements RDD convolution according to the calculations 335 (FIG. 3), a model that processes the input tensor X 405 to generate the output tensor Y 415, a model that implements RDD convolution according to the algorithm 410, a model associated with instantiation of the function $f(d)$ according to the stage 420 of the algorithm 410, a model associated with execution of the instantiated function $f_d(\ )$ according to the stage 425 of the algorithm 410 (FIG. 4), a model that processes image data captured using the image capture and processing system 500 to generate processed image data (FIG. 5), or a combination thereof.

An input layer 610 of the neural network 600 includes input data. With reference to FIGS. 1-6, examples of input data included in the input layer 610 include the input features 130 (of FIG. 1), the 8-dimensional dataset (PQR-SWXYZ) of FIG. 2 that is processed in the process 200, the input tensor 305 (of FIG. 3), the input tensor X 405 (of FIG. 4), image data captured using the image capture and processing system 500 (of FIG. 5), the tensor received in operation 705 (of FIG. 7), an input received by or generated using the computing system 800 (of FIG. 8), or a combination thereof. In some examples, the input data of the input layer 610 can include data representing the pixels of one or more input image frames, for instance including image data captured using the image capture and processing system 500 (of FIG. 5). In some examples, the input data of the input layer 610 includes processed data that is to be processed further, such as various features, tensors, weights, intermediate data, or a combination thereof.

In examples where the input layer 610 includes images, the images can include image data from an image sensor including raw pixel data (including a single color per pixel based, for example, on a Bayer filter) or processed pixel values (e.g., RGB pixels of an RGB image). The neural network 600 includes multiple hidden layers 612, 612B, through 612N. The hidden layers 612, 612B, through 612N include "N" number of hidden layers, where "N" is an integer greater than or equal to one. The number of hidden layers can be made to include as many layers as needed for the given application. The neural network 600 further includes an output layer 614 that provides an output resulting from the processing performed by the hidden layers 612, 612B, through 612N.

In some examples, the output layer 614 can provide output data. With reference to FIGS. 1-7, examples of the output data that is provided by the output layer 614 can include the model output 140 (of FIG. 1), a processed dataset generated by processing the 8-dimensional dataset (PQR-SWXYZ) of FIG. 2 using the process 200, an output generated by processing the input tensor 305 using the equation 320 and/or the equation 325 and/or the calculations 330 and/or the calculations 335 (of FIG. 3), the output tensor Y 415 (of FIG. 4), a processed variant of image data that is captured using the image capture and processing system 500 (of FIG. 5), the processed tensor of operation 710 (of FIG. 7), or a combination thereof.

The neural network 600 is a multi-layer neural network of interconnected filters. Each filter can be trained to learn a feature representative of the input data. Information associated with the filters is shared among the different layers and each layer retains information as information is processed. In some cases, the neural network 600 can include a feed-forward network, in which case there are no feedback connections where outputs of the network are fed back into itself. In some cases, the network 600 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 610 can activate a set of nodes in the first hidden layer 612A. For example, as shown, each of the input nodes of the input layer 610 can be connected to each of the nodes of the first hidden layer 612A. The nodes of a hidden layer can transform the information of each input node by applying activation functions (e.g., filters) to the information. The information derived from the transformation can then be passed to and can activate the nodes of the next hidden layer 612B, which can perform their own designated functions. Example functions include convolutional functions, downscaling, upscaling, data transformation, and/or any other suitable functions. The output of the hidden layer 612B can then activate nodes of the next hidden layer, and so on. The output of the last hidden layer 612N can activate one or more nodes of the output layer 614, which provides a processed output image. In some cases, while nodes (e.g., node 616) in the neural network 600 are shown as having multiple output lines, a node has a single output and all lines shown as being output from a node represent the same output value.

In some cases, each node or interconnection between nodes can have a weight that is a set of parameters derived from the training of the neural network 600. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 610 using the different hidden layers 612, 612B, through 612N in order to provide the output through the output layer 614.

Figure 7:
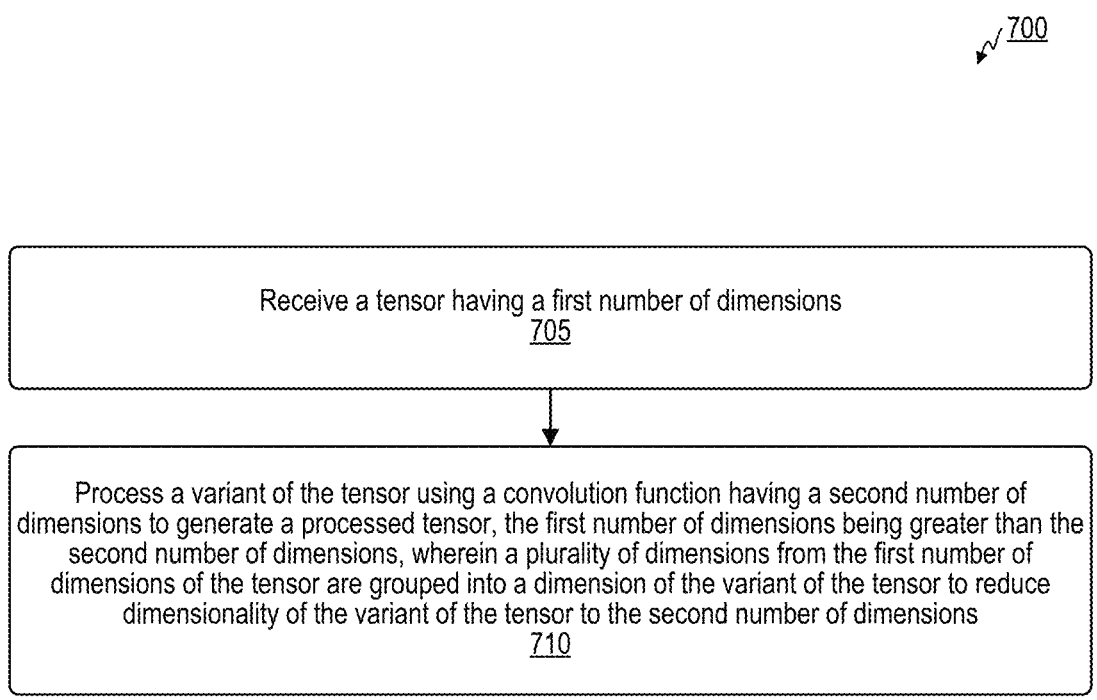
FIG. 7 is a flow diagram illustrating a process for dimensional decomposition convolution, in accordance with some examples.

FIG. 7 is a flow diagram illustrating a process 700 for dimensional decomposition convolution. The process 700 for dimensional decomposition convolution may be performed by a convolution system (e.g., a chipset, a processor or multiple processors such as an ISP, host processor, application processor, or other processor, or other component). With reference to FIGS. 1-6, in some examples, the convolution system can include, for example, the model architecture 105, the RDD convolution system that performs the process 200, the RDD convolution system that performs the process 300, the RDD convolution system that performs the process 400 and/or runs the algorithm 410, the image capture and processing system 500, the image capture device 505A, the image processing device 505B, the image processor 550, the ISP 554, the host processor 552, the neural network 600, the computing system 800 (of FIG. 8), the processor 810, a system, apparatus, a device, a non-transitory computer readable medium having stored thereon a program to be performed using a processor, or a combination thereof.

With reference to FIGS. 1-7, at operation 705, the convolution system (or component thereof) is configured to, and can, receive a tensor including a first number of dimensions. With reference to FIGS. 1-6, examples of the tensor (and the first number of dimensions) include the input features 130 (with number of dimensions D 115), the 8-dimensional dataset (PQRSWXYZ) of FIG. 2 (having 8 dimensions), the input tensor 305 (with number of dimensions D 310), the input tensor X 405 (with number of dimensions D), an input tensor received via the input layer 610, another tensor or feature or dataset discussed herein, or a combination thereof.

At operation 710, the convolution system (or component thereof) is configured to, and can, process (e.g., convolve) a variant of the tensor using a convolution function including a second number of dimensions to generate a processed tensor. The first number of dimensions is greater than the second number of dimensions. A plurality of dimensions from the first number of dimensions of the tensor are grouped into a dimension of the variant of the tensor to reduce dimensionality of the variant of the tensor to the second number of dimensions. For instance, in the context of FIG. 2, the 8-dimensional dataset (PQRSWXYZ) of operation 250A is an example of the tensor of operation 705, while the variants in operations 250B-250F are each examples of the variant of the tensor of operation 710. Examples of the plurality of dimensions from the first number of dimensions of the tensor being grouped into the dimension of the variant of the tensor can include the plurality of dimensions grouped into the remaining group 205 in operations 250C-250F and/or the plurality of dimensions grouped into the batch dimension 215 in operations 250E-250F.

In some examples, the convolution system (or component thereof) is configured to, and can, select a particular dimension of the first number of dimensions. The particular dimension is distinct from the plurality of dimensions that are grouped. The particular dimension represents a second dimension of the variant of the tensor. With reference to FIGS. 2-4, for instance, the "peeling" of a dimension into the peel dimension 220 in operations 250C-250F can be an example of the selecting of the particular dimension. Examples of the particular dimension can include any dimension in the peel dimension 220 in any of operations 250C-250F, a single peeled dimension (e.g., dimension 1) in FIG. 3 (e.g., in the equation 320, the equation 325, the calculations 330, and/or the calculations 335), a single peeled dimension in the algorithm 410, any other peel dimension or peeled dimension discussed herein, or a combination thereof.

In some examples, the convolution system (or component thereof) is configured to, and can, convolve the variant of the tensor using the convolution function to process the variant of the tensor using the convolution function as in operation 710. For instance, in some examples, processing the variant of the tensor using the convolution function as in operation 710 can include convolving the variant of the tensor using the convolution function. With reference to FIGS. 1-4 and 6, examples of the convolving include convolution(s) that are part of the model execution 135, convolutions performed as part of operations 250C-250F, the convolution functions Conv( ) in FIG. 3 (e.g., in the equation 320, the equation 325, the calculations 330, and/or the calculations 335), the convolution functions Conv( ) the algorithm 410, convolution(s) performed using the neural network 600, or a combination thereof.

In some examples, the convolution system (or component thereof) is configured to, and can, processing a second variant of the tensor using the convolution function to generate a second processed tensor, wherein a second plurality of dimensions from the first number of dimensions of the tensor are grouped into a dimension of the second variant of the tensor to reduce dimensionality of the second variant of the tensor to the second number of dimensions, wherein the second variant of the tensor includes the processed tensor representing one of the second plurality of dimensions. In some examples, the convolution system (or component thereof) is configured to, and can, convolving the second variant of the tensor using the convolution function to process the second variant of the tensor using the convolution function. In some examples, the convolution system (or component thereof) is configured to, and can, selecting a second specified dimension of the first number of dimensions, the second specified dimension distinct from the second plurality of dimensions that are grouped, wherein the second specified dimension represents a second dimension of the second variant of the tensor. In some examples, the second plurality of dimensions include at least one batched processed dimension, the at least one batched processed dimension including at least the processed tensor.

In some examples, the convolution system (or component thereof) is configured to, and can, iteratively convolve a plurality of variations of the tensor using the convolution function according to an equation to convolve the variant of the tensor. With reference to FIG. 3, in some examples, the equation includes at least one of equation 320 (Conv(D) ≙Conv(D−1)°Conv(1)), equation 325 (Conv(D)≙Conv(1) °Conv(D−1)), or a combination thereof. In the equation, D represents the first number of dimensions. With reference to FIGS. 2-4, examples of iteratively convolve a plurality of variations of the tensor using the convolution function according to the equation include the operations 250C-250F, the calculations 330, the calculations 335, the algorithm 410, or combinations thereof.

In some examples, the second number of dimensions is 2, and the first number of dimensions is at least 3. For instance, the tensor can have 3 or more dimensions, and the convolution function can be a 2-dimensional convolution function (e.g., Conv2D). In some examples, the second number of dimensions is 3, and the first number of dimensions is at least 4. For instance, the tensor can have 4 or more dimensions, and the convolution function can be a 3-dimensional convolution function (e.g., Conv3D). In an illustrative example, the tensor can have 5 or more dimensions, as in Neural Radiance Fields (NeRF).

In some examples, the convolution system (or component thereof) is configured to, and can, receive image data associated with the tensor, and process the image data to generate processed image data associated with the processed tensor. In some examples, the processed image data includes at least a portion of the processed tensor, or the image data is processed based on the processed tensor to generate the processed imaged data. In some examples, the convolution system (or component thereof) is configured to, and can, receive video data, associated with the tensor, and process the video data to generate processed video data associated with the processed tensor. In some examples, the processed video data includes at least a portion of the processed tensor, or the video data is processed based on the processed tensor to generate the processed video data. With reference to FIG. 5, the image data and/or video data can include, for instance image data captured using the image capture and processing system 500, the image capture device 505A, the image processing device 505B, the image sensor 530, or a combination thereof. In some examples, the convolution system (or component thereof) is configured to, and can, receive the image data and/or video data from an image sensor and/or a camera that captures the image data and/or video data, such as the image capture and processing system 500, the image capture device 505A, the image processing device 505B, the image sensor 530, or a combination thereof.

In some examples, the convolution system (or component thereof) is configured to, and can, receive audio data associated with the tensor, and process the audio data to generate processed audio data associated with the processed tensor. In some examples, the processed audio data includes at least a portion of the processed tensor, or the audio data is processed based on the processed tensor to generate the processed audio data. In some examples, the convolution system (or component thereof) is configured to, and can, receive text data associated with the tensor, and process the text data to generate processed text data associated with the processed tensor. In some examples, the processed text data includes at least a portion of the processed tensor, or the text data is processed based on the processed tensor to generate the processed text data.

In some examples, the tensor and/or the processed tensor is associated with Neural Radiance Fields (NeRF). For instance, the tensor can be a 5-dimensional volume, such as a volume (x, y, z, θ, φ), associated with NeRF and used for geometric regression and/or representation. In some examples, the tensor and/or the processed tensor is associated with depth from stereo (DFS), for instance used for 3D reconstruction, synthesis, simultaneous localization and mapping (SLAM), geometry, or a combination thereof.

In some examples, the convolution system (or component thereof) includes means for receiving a tensor including a first number of dimensions. In some examples, the convolution system (or component thereof) includes means for processing a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example computing system 800 includes at least one processor 810, such as a central processing unit (CPU), graphics processing unit (GPU), neural processing unit (NPU), digital signal processor (DSP), image signal processor (ISP), a field programmable gate array (FPGA), an application specific integrated circuit (ASIC), a microprocessor, a controller, another type of processing unit, another suitable electronic circuit, or a combination thereof. The computing system 800 also includes a connection 805 that couples various system components including system memory 815, such as read-only memory (ROM) 820 and random-access memory (RAM) 825 to the processor 810. Computing system 800 can include a cache 812 of high-speed memory connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, causes the system to perform a function. In some examples, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special-purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, In some examples, the functionality described herein may be provided within dedicated software modules or hardware modules configured for encoding and decoding, or incorporated in a combined video encoder-decoder (CODEC).

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. An apparatus for imaging, the apparatus comprising: a memory; and at least one processor (e.g., implemented in circuitry) coupled to the memory and configured to: receive a tensor including a first number of dimensions; and process a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

Aspect 2. The apparatus of Aspect 1, wherein the at least one processor is configured to: convolve the variant of the tensor using the convolution function to process the variant of the tensor using the convolution function.

Aspect 3. The apparatus of any of Aspects 1 or 2, wherein the at least one processor is configured to: select a particular dimension of the first number of dimensions, the particular dimension distinct from the plurality of dimensions that are grouped, wherein the particular dimension represents a second dimension of the variant of the tensor.

Aspect 4. The apparatus of any of Aspects 1 to 3, wherein the at least one processor is configured to: process a second variant of the tensor using the convolution function to generate a second processed tensor, wherein a second plurality of dimensions from the first number of dimensions of the tensor are grouped into a dimension of the second variant of the tensor to reduce dimensionality of the second variant of the tensor to the second number of dimensions, and wherein the second variant of the tensor includes the processed tensor representing one of the second plurality of dimensions.

Aspect 5. The apparatus of Aspect 4, wherein the at least one processor is configured to: convolve the second variant of the tensor using the convolution function to process the second variant of the tensor using the convolution function.

Aspect 6. The apparatus of any of Aspects 4 to 5, wherein the at least one processor is configured to: select a second specified dimension of the first number of dimensions, the second specified dimension distinct from the second plurality of dimensions that are grouped, wherein the second specified dimension represents a second dimension of the second variant of the tensor.

Aspect 7. The apparatus of any of Aspects 4 to 6, wherein the second plurality of dimensions include at least one batched processed dimension, the at least one batched processed dimension including at least the processed tensor.

Aspect 8. The apparatus of any of Aspects 1 to 7, wherein the at least one processor is configured to: iteratively convolve a plurality of variations of the tensor using the convolution function according to an equation to convolve the variant of the tensor, wherein the equation is $\text{Conv}(D) \triangleq \text{Conv}(D-1) \circ \text{Conv}(1)$, wherein D represents the first number of dimensions.

Aspect 9. The apparatus of any of Aspects 1 to 8, wherein the at least one processor is configured to: iteratively convolve a plurality of variations of the tensor using the convolution function according to an equation to convolve the variant of the tensor, wherein the equation is $\text{Conv}(D) \triangleq \text{Conv}(1) \circ \text{Conv}(D-1)$, wherein D represents the first number of dimensions.

Aspect 10. The apparatus of any of Aspects 1 to 9, wherein the second number of dimensions is 2, and wherein the first number of dimensions is at least 3.

Aspect 11. The apparatus of any of Aspects 1 to 10, wherein the second number of dimensions is 3, and wherein the first number of dimensions is at least 4.

Aspect 12. The apparatus of any of Aspects 1 to 11, wherein the at least one processor is configured to: receive image data, wherein the tensor is associated with the image data; and process the image data to generate processed image data, wherein the processed tensor is associated with the processed image data.

Aspect 13. The apparatus of any of Aspects 1 to 12, wherein the at least one processor is configured to: receive video data, wherein the tensor is associated with the video data; and process the video data to generate processed video data, wherein the processed tensor is associated with the processed video data.

Aspect 14. The apparatus of any of Aspects 1 to 13, wherein the at least one processor is configured to: receive audio data, wherein the tensor is associated with the audio data; and process the audio data to generate processed audio data, wherein the processed tensor is associated with the processed audio data.

Aspect 15. The apparatus of any of Aspects 1 to 14, wherein the at least one processor is configured to: receive text data, wherein the tensor is associated with the text data; and process the text data to generate processed text data, wherein the processed tensor is associated with the processed text data.

Aspect 16. The apparatus of any of Aspects 1 to 15, wherein the processed tensor is associated with Neural Radiance Fields (NeRF).

Aspect 17. The apparatus of any of Aspects 1 to 16, wherein the apparatus includes at least one of a head-mounted display (HMD), a mobile handset, or a wireless communication device.

Aspect 18. A method of dimensional decomposition convolution, the method comprising: receiving a tensor including a first number of dimensions; and processing a variant of the tensor using a convolution function including a second number of dimensions to generate a processed tensor, the first number of dimensions being greater than the second number of dimensions, wherein a plurality of dimensions from the first number of dimensions of the tensor are grouped into a dimension of the variant of the tensor to reduce dimensionality of the variant of the tensor to the second number of dimensions.

Aspect 19. The method of Aspect 18, further comprising: convolving the variant of the tensor using the convolution function to process the variant of the tensor using the convolution function.

Aspect 20. The method of any of Aspects 18 or 19, further comprising: selecting a particular dimension of the first number of dimensions, the particular dimension distinct from the plurality of dimensions that are grouped, wherein the particular dimension represents a second dimension of the variant of the tensor.

Aspect 21. The method of any of Aspects 18 to 20, further comprising: processing a second variant of the tensor using the convolution function to generate a second processed tensor, wherein a second plurality of dimensions from the first number of dimensions of the tensor are grouped into a dimension of the second variant of the tensor to reduce dimensionality of the second variant of the tensor to the second number of dimensions, and wherein the second variant of the tensor includes the processed tensor representing one of the second plurality of dimensions.

Aspect 22. The method of Aspect 21, further comprising: convolving the second variant of the tensor using the convolution function to process the second variant of the tensor using the convolution function.

Aspect 23. The method of any of Aspects 21 to 22, further comprising: selecting a second specified dimension of the first number of dimensions, the second specified dimension distinct from the second plurality of dimensions that are grouped, wherein the second specified dimension represents a second dimension of the second variant of the tensor.

Aspect 24. The method of any of Aspects 21 to 23, wherein the second plurality of dimensions include at least one batched processed dimension, the at least one batched processed dimension including at least the processed tensor.

Aspect 25. The method of any of Aspects 18 to 24, further comprising: iteratively convolving a plurality of variations of the tensor using the convolution function according to an equation to convolve the variant of the tensor, wherein the equation is Conv(D)≙Conv(D−1) °Conv(1), wherein D represents the first number of dimensions.

Aspect 26. The method of any of Aspects 18 to 25, further comprising: iteratively convolving a plurality of variations of the tensor using the convolution function according to an equation to convolve the variant of the tensor, wherein the equation is Conv(D)≙Conv(1) °Conv(D−1), wherein D represents the first number of dimensions.

Aspect 27. The method of any of Aspects 18 to 26, wherein the second number of dimensions is 2, and wherein the first number of dimensions is at least 3.

Aspect 28. The method of any of Aspects 18 to 27, wherein the second number of dimensions is 3, and wherein the first number of dimensions is at least 4.

Aspect 29. The method of any of Aspects 18 to 28, further comprising: receiving image data, wherein the tensor is associated with the image data; and processing the image data to generate processed image data, wherein the processed tensor is associated with the processed image data.

Aspect 30. The method of any of Aspects 18 to 29, further comprising: receiving video data, wherein the tensor is associated with the video data; and processing the video data to generate processed video data, wherein the processed tensor is associated with the processed video data.

Aspect 31. The method of any of Aspects 18 to 30, further comprising: receiving audio data, wherein the tensor is associated with the audio data; and processing the audio data to generate processed audio data, wherein the processed tensor is associated with the processed audio data.

Aspect 32. The method of any of Aspects 18 to 31, further comprising: receiving text data, wherein the tensor is associated with the text data; and processing the text data to generate processed text data, wherein the processed tensor is associated with the processed text data.

Aspect 33. The method of any of Aspects 18 to 32, wherein the processed tensor is associated with Neural Radiance Fields (NeRF).

Aspect 34. A non-transitory computer-readable medium having stored thereon instructions that, when executed by one or more processors, cause the one or more processors to perform operations according to any of Aspects 1 to 33.

Aspect 35. An apparatus for imaging, the apparatus comprising one or more means for performing operations according to any of Aspects 1 to 33.

What is claimed is:

1. An apparatus for dimensional decomposition convolution, the apparatus comprising:
at least one memory; and
at least one processor coupled to the at least one memory and configured to:
receive a tensor including a first number of dimensions; and
process a variant of the tensor using a convolution function including a second number of dimensions to generate a processed tensor, the first number of dimensions being greater than the second number of dimensions,
wherein a plurality of dimensions from the first number of dimensions of the tensor are grouped into a dimension of the variant of the tensor to reduce dimensionality of the variant of the tensor to the second number of dimensions.

2. The apparatus of claim 1, wherein the at least one processor is configured to:
convolve the variant of the tensor using the convolution function to process the variant of the tensor using the convolution function.

3. The apparatus of claim 1, wherein the at least one processor is configured to:
select a particular dimension of the first number of dimensions, the particular dimension distinct from the plurality of dimensions that are grouped, wherein the particular dimension represents a second dimension of the variant of the tensor.

4. The apparatus of claim 1, wherein the at least one processor is configured to:
process a second variant of the tensor using the convolution function to generate a second processed tensor, wherein a second plurality of dimensions from the first number of dimensions of the tensor are grouped into a dimension of the second variant of the tensor to reduce dimensionality of the second variant of the tensor to the second number of dimensions, and wherein the second variant of the tensor includes the processed tensor representing one of the second plurality of dimensions.

5. The apparatus of claim 4, wherein the at least one processor is configured to:
convolve the second variant of the tensor using the convolution function to process the second variant of the tensor using the convolution function.

6. The apparatus of claim 4, wherein the at least one processor is configured to:
select a second specified dimension of the first number of dimensions, the second specified dimension distinct from the second plurality of dimensions that are grouped, wherein the second specified dimension represents a second dimension of the second variant of the tensor.

7. The apparatus of claim 4, wherein the second plurality of dimensions include at least one batched processed dimension, the at least one batched processed dimension including at least the processed tensor.

8. The apparatus of claim 1, wherein the at least one processor is configured to:
iteratively convolve a plurality of variations of the tensor using the convolution function according to an equation to convolve the variant of the tensor, wherein the equation is $\text{Conv}(D) \triangleq \text{Conv}(D-1) \circ \text{Conv}(1)$, wherein D represents the first number of dimensions.

9. The apparatus of claim 1, wherein the at least one processor is configured to:
iteratively convolve a plurality of variations of the tensor using the convolution function according to an equation to convolve the variant of the tensor, wherein the equation is $\text{Conv}(D) \triangleq \text{Conv}(1) \circ \text{Conv}(D-1)$, wherein D represents the first number of dimensions.

10. The apparatus of claim 1,
wherein the second number of dimensions is 2, and
wherein the first number of dimensions is at least 3.

11. The apparatus of claim 1,
wherein the second number of dimensions is 3, and
wherein the first number of dimensions is at least 4.

12. The apparatus of claim 1, wherein the at least one processor is configured to:
receive image data, wherein the tensor is associated with the image data; and
process the image data to generate processed image data, wherein the processed tensor is associated with the processed image data.

13. The apparatus of claim 1, wherein the at least one processor is configured to:
receive video data, wherein the tensor is associated with the video data; and
process the video data to generate processed video data, wherein the processed tensor is associated with the processed video data.

14. The apparatus of claim 1, wherein the at least one processor is configured to:
receive audio data, wherein the tensor is associated with the audio data; and
process the audio data to generate processed audio data, wherein the processed tensor is associated with the processed audio data.

15. The apparatus of claim 1, wherein the at least one processor is configured to:
receive text data, wherein the tensor is associated with the text data; and
process the text data to generate processed text data, wherein the processed tensor is associated with the processed text data.

16. The apparatus of claim 1, wherein the processed tensor is associated with Neural Radiance Fields (NeRF).

17. A method of dimensional decomposition convolution, the method comprising:
receiving a tensor including a first number of dimensions; and
processing a variant of the tensor using a convolution function including a second number of dimensions to generate a processed tensor, the first number of dimensions being greater than the second number of dimensions,
wherein a plurality of dimensions from the first number of dimensions of the tensor are grouped into a dimension of the variant of the tensor to reduce dimensionality of the variant of the tensor to the second number of dimensions.

18. The method of claim 17, further comprising:
convolving the variant of the tensor using the convolution function to process the variant of the tensor using the convolution function.

19. The method of claim 17, further comprising:
selecting a particular dimension of the first number of dimensions, the particular dimension distinct from the plurality of dimensions that are grouped, wherein the particular dimension represents a second dimension of the variant of the tensor.

20. The method of claim 17, further comprising:
processing a second variant of the tensor using the convolution function to generate a second processed tensor,
wherein a second plurality of dimensions from the first number of dimensions of the tensor are grouped into a dimension of the second variant of the tensor to reduce dimensionality of the second variant of the tensor to the second number of dimensions, and
wherein the second variant of the tensor includes the processed tensor representing one of the second plurality of dimensions.

21. The method of claim 20, further comprising:
selecting a second specified dimension of the first number of dimensions, the second specified dimension distinct from the second plurality of dimensions that are grouped, wherein the second specified dimension represents a second dimension of the second variant of the tensor.

22. The method of claim 20, wherein the second plurality of dimensions include at least one batched processed dimension, the at least one batched processed dimension including at least the processed tensor.

23. The method of claim 17, further comprising:
iteratively convolving a plurality of variations of the tensor using the convolution function according to an equation to convolve the variant of the tensor, wherein the equation is $\text{Conv}(D) \triangleq \text{Conv}(D-1) \circ \text{Conv}(1)$, wherein D represents the first number of dimensions.

24. The method of claim 17, further comprising:
iteratively convolving a plurality of variations of the tensor using the convolution function according to an equation to convolve the variant of the tensor, wherein the equation is $\text{Conv}(D) \triangleq \text{Conv}(1) \circ \text{Conv}(D-1)$, wherein D represents the first number of dimensions.

25. The method of claim 17,
wherein the second number of dimensions is 2, and
wherein the first number of dimensions is at least 3.

26. The method of claim 17,
wherein the second number of dimensions is 3, and
wherein the first number of dimensions is at least 4.

27. The method of claim 17, further comprising:
receiving image data, wherein the tensor is associated with the image data; and
processing the image data to generate processed image data, wherein the processed tensor is associated with the processed image data.

28. The method of claim 17, further comprising:
receiving video data, wherein the tensor is associated with the video data; and
processing the video data to generate processed video data, wherein the processed tensor is associated with the processed video data.

29. The method of claim 17, further comprising:
receiving audio data, wherein the tensor is associated with the audio data; and processing the audio data to generate processed audio data, wherein the processed tensor is associated with the processed audio data.

30. The method of claim 17, further comprising:

receiving text data, wherein the tensor is associated with the text data; and processing the text data to generate processed text data, wherein the processed tensor is associated with the processed text data.

* * * * *